US010785285B2

(12) United States Patent
Ning

(10) Patent No.: US 10,785,285 B2
(45) Date of Patent: Sep. 22, 2020

(54) FILE UPLOADING AND DOWNLOADING METHOD BASED ON A SMART DEVICE

(71) Applicant: SHENZHEN SKYWORTH-RGB ELECTRONIC CO., LTD., Shenzhen, Guangdong (CN)

(72) Inventor: Qiumei Ning, Guangdong (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 133 days.

(21) Appl. No.: 16/078,959

(22) PCT Filed: Jan. 6, 2017

(86) PCT No.: PCT/CN2017/070480
§ 371 (c)(1),
(2) Date: Aug. 22, 2018

(87) PCT Pub. No.: WO2018/053975
PCT Pub. Date: Mar. 29, 2018

(65) Prior Publication Data
US 2019/0089767 A1 Mar. 21, 2019

(30) Foreign Application Priority Data
Sep. 20, 2016 (CN) .......................... 2016 1 0835527

(51) Int. Cl.
*G06F 15/16* (2006.01)
*H04L 29/08* (2006.01)
(Continued)

(52) U.S. Cl.
CPC ............ *H04L 67/06* (2013.01); *G06F 16/182* (2019.01); *H04L 67/02* (2013.01); *H04L 67/141* (2013.01);
(Continued)

(58) Field of Classification Search
CPC ......... H04L 67/02; H04L 67/06; H04L 67/26; H04L 67/28; H04L 67/141; H04W 88/02
See application file for complete search history.

(56) References Cited

U.S. PATENT DOCUMENTS

2008/0143517 A1 6/2008 Goffin
2009/0215477 A1 8/2009 Lee et al.
(Continued)

FOREIGN PATENT DOCUMENTS

CN 101083537 12/2007
CN 102665114 9/2012
(Continued)

OTHER PUBLICATIONS

Examination Report dated Jun. 13, 2019 from corresponding application No. AU 2017331961.
(Continued)

*Primary Examiner* — Yves Dalencourt
(74) *Attorney, Agent, or Firm* — Hauptman Ham, LLP

(57) ABSTRACT

Disclosed is a file uploading and downloading method based on a smart device. According to which a unique ID of the smart device is obtained and entered into a mobile device, whereby a communication connection is established between the mobile device and the smart device through a proxy service. As such, the mobile device can download the relevant files within the smart device through the web service and the proxy service, while the smart device can also obtain the files uploaded by the mobile device through the proxy service and the web service.

9 Claims, 4 Drawing Sheets

(51) Int. Cl.
*G06F 16/182* (2019.01)
*H04W 88/02* (2009.01)
*H04W 88/18* (2009.01)

(52) U.S. Cl.
CPC .............. *H04L 67/26* (2013.01); *H04L 67/28* (2013.01); *H04W 88/02* (2013.01); *H04W 88/182* (2013.01)

(56) References Cited

U.S. PATENT DOCUMENTS

2013/0347044 A1* 12/2013 Lee .................... H04N 21/2387
725/88
2016/0277506 A1* 9/2016 Wu ..................... G06Q 30/0613
2019/0035008 A1* 1/2019 Venters, III ............ G06Q 30/02

FOREIGN PATENT DOCUMENTS

| | | |
|---|---|---|
| CN | 104780082 | 7/2015 |
| CN | 105611330 | 5/2016 |
| CN | 105872102 | 8/2016 |
| CN | 106533813 | 3/2017 |
| EP | 2677757 | 12/2013 |

OTHER PUBLICATIONS

International search report dated May 31, 2017 from corresponding application No. PCT/CN2017/070480.
Office Action dated Apr. 2, 2019 from corresponding application No. CN 201610835527.5.

* cited by examiner

FILE UPLOADING AND DOWNLOADING METHOD BASED ON A SMART DEVICE

RELATED APPLICATIONS

The present application is a National Phase of International Application Number PCT/CN2017/070480, filed Jan. 6, 2017, and claims the priority of China Application No. 201610835527.5, filed Sep. 20, 2016.

TECHNICAL FIELD

This disclosure pertains to a file uploading and downloading method based on a smart device.

BACKGROUND

While the popularization of smart devices has led to the intelligentization of homes, it has also caused inconvenience to users. For example, if an error arises in an application, a configuration file, or a parsing library at the user's home, or there are other problems that need to be solved, then an engineer would need to go to the user's home to upload files to the smart device or download relevant files from the smart device.

In addition, if during the development and testing process the development and testing are not carried out in the same area, or in the same area but different networks are applied, then when encountering problems it would entail uploading the latest program to the smart device or downloading, e.g., the log file from the smart device for analysis, which is inconvenient and time-consuming.

The present mainstream method for solving the above problems is to upload files to or downloading the relevant files from the smart device using an Android system-based adb (Android Debug Bridge) or a USB flash drive. But the adb method requires the network environment on the PC side be consistent with the network environment of the smart device, and the IP address of the smart device also needs to be known; otherwise if the smart device is installed with a non-Android system, then only the USB flash drive can be used for data exchange with the smart device, and it entails connecting the smart device to a serial line and entering necessary commands.

SUMMARY

It is therefore one main object of this disclosure to provide a file uploading and downloading method based on a smart device, aiming to solve the technical problem that the existing adb method is restricted by the network environments and IP addresses while the USB flash drive approach is subject to the connection command.

To achieve the above object, this disclosure provides a file uploading and downloading method based on a smart device, which includes the following operations: obtaining a unique identifier (ID) from the smart device and entering the ID to a mobile device; establishing a communication connection between the mobile device and the smart device through a proxy service; and uploading or downloading, by the mobile device, a file to or from the smart device.

Further, establishing the communication connection between the mobile device and the smart device through the proxy service includes: carrying, by the mobile device, the unique ID, and establishing a connection with a web service; carrying, by the web service, the unique ID, and obtaining a push ID of smart device remote service from a push service; prompting, by the push service via the smart device, a user whether to accept a connection request from the mobile device, and establishing, by the smart device and the proxy service, a one-time connection therebetween if the user doesn't accept the connection request; otherwise establishing, by the smart device and the proxy service, a long TCP connection therebetween if the user accepts the connection request; determining, by the mobile device, whether the smart device accepts its connection request, and providing a corresponding alert on its interface if the smart device doesn't accept the connection request; otherwise carrying the unique ID and a service ID of the mobile device to establish a long connection with the proxy service if the smart device accepts the connection request; and sending, by the proxy service, a service ID of the smart device to the mobile device, and the service ID of the mobile device to the smart device.

Further, prior to determining by the mobile device whether the smart device accepts its connection request, the file uploading and downloading method further includes: carrying, by the web service, the unique ID, and establishing a connection with the proxy service; sending, by the proxy service, the result of the connection request of the mobile device to the web service; and sending, by the web service, the result of the connection request directly to the mobile device.

Further, uploading by the mobile device the file to the smart device includes: selecting a file and a destination path on the mobile device, and uploading, by the mobile device, the file and the destination path to the web service; feeding back, by the web service, information regarding whether the file is uploaded successfully, as well as related information of the file; determining, by the mobile device, whether the file is uploaded successfully according to the feedback information, and if the mobile device determines that the file hasn't been successfully uploaded, then providing an alert and a reason, otherwise if the mobile device determines that the file has been uploaded successfully, then sending the file path and destination path in the web service as a command to the proxy service; analyzing, by the proxy service, the command and determining whether a target of the command is the service itself, and if the target of the command is the service itself, then processing the file path and destination path by itself, otherwise forwarding the file path and the destination path to the smart device; and downloading, by the smart device, the file to the destination path according to the file path, and feeding the file downloading result back to the mobile device.

Further, subsequent to downloading by the smart device the file to the destination path according to the file path and feeding the file downloading result back to the mobile device, the file uploading and downloading method further includes: analyzing, by the proxy service, a target of the command according to which the smart device feeds the file downloading result back to the mobile device, and determining whether the target of the command is the service itself, and if the proxy service determines that target of the command is the service itself, then processing the file downloading result by itself, otherwise if the proxy service determines that the target of the command isn't the service itself, then forwarding the file downloading result directly to the mobile device.

Further, downloading by the mobile device the file from the smart device includes: entering a destination file path on the mobile device and generating and sending a corresponding command to the proxy service; analyzing, by the proxy service, the command and determining whether a target of the command is the service itself, and if the target of the command is the service itself, then processing the destination file path by itself; otherwise forwarding the destination file path to the smart device; analyzing, by the smart device, the destination file path, and determining whether the destination file exists, and if the smart device determines that the destination file doesn't exist, then feeding the result back to the mobile device, otherwise if the smart device determines that the destination file exists, then establishing a new port to connect to the proxy service; writing, by the proxy service, the destination file to the path of the web service via the port, and further sending the destination file to the mobile device; and determining, by the mobile device, whether the file is downloaded successfully, and if the file isn't successfully downloaded, providing an alert and a reason on its interface, otherwise if the file is downloaded successfully, then setting up, by the mobile device, a new window for downloading from the web service.

Further, feeding the result back to the mobile device includes: feeding, by the proxy service, the analyzing result to back to a target of command of the mobile device, and determining whether the target of the command is the service itself, and if the proxy service determines that target of the command is the service itself, then processing the analyzing result by itself; otherwise if the proxy service determines that the target of the command isn't the service itself, then forwarding the analyzing result directly to the mobile device.

Further, the related information of the file includes a file path, a file name, and a file size.

Further, the mobile device includes a mobile phone, a Pad, and a personal computer (PC).

Further, the smart device includes a smart television, a smart speaker, a smart water heater, and a smart projector.

According to the file uploading and downloading method based on a smart device provided by this disclosure, the unique ID of the smart device is obtained and entered into the mobile device, whereby a communication connection is established between the mobile device and the smart device through a proxy service. As such, the mobile device can download the relevant files within the smart device through the web service and the proxy service, while the smart device can also obtain the files uploaded by the mobile device through the proxy service and the web service, without being restricted to the network environments and IP addresses and without needing specific connection commands. This solves the technical problem that existing adb method is restricted by the network environments and IP addresses while the USB flash drive approach is subject to connection commands, thereby providing ease of operation and ease of use and enabling a wide range of applications.

BRIEF DESCRIPTION OF THE ACCOMPANYING DRAWINGS

To better illustrate the technical solutions that are reflected in various embodiments according to this disclosure or that are found in the prior art, the accompanying drawings intended for the description of the embodiments herein or for the prior art will now be briefly described. It is evident that the accompanying drawings listed in the following description show merely some embodiments according to this disclosure, and that those having ordinary skill in the art will be able to obtain other drawings based on the arrangements shown in these drawings without making inventive efforts, where in the drawings:

Figure 1:
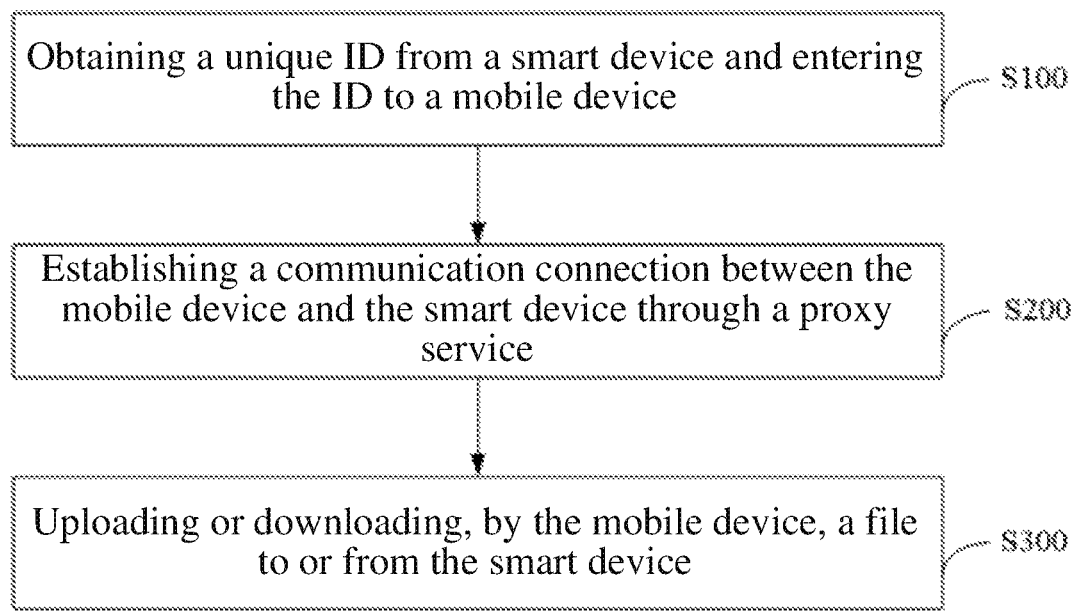
FIG. 1 is a flowchart illustrating an embodiment of a file uploading and downloading method based on a smart device in accordance with this disclosure.

Various implementations, functional features, and advantages of this disclosure will now be described in further detail in connection with some illustrative embodiments and the accompanying drawings.

DETAILED DESCRIPTION OF ILLUSTRATIVE EMBODIMENTS

Technical solutions reflected in various embodiments according to this disclosure will now be described in a clear and comprehensive manner in connection with the accompanying drawings intended for these embodiments. It is evident that the described embodiments are merely some rather than all of the embodiments of this disclosure. All other embodiments obtained by persons having ordinary skill in the art based on the embodiments of this disclosure without making inventive efforts shall all fall within the scope of protection of this disclosure.

It should be noted that all directional indicators (such as "up" "down" "left" "right" "front" or "rear") as used in the embodiments herein are merely used to illustrate the relative positions and movements or the like of various components or parts under a specific posture (as depicted in the drawings), and that should the specific posture change, these directional indicators will change accordingly.

As used herein, terms such as "first" or "second" are intended for illustrative purposes only and are not to be construed as indicating or implying their relative importance or implicitly indicating the number of the specified technical features. Thus, a feature defined by terms such as "first" or "second" may explicitly or implicitly include at least one of such a feature. Additionally, technical solutions of various embodiments may be combined with one another; but such combinations must be premised on the achievability to those having ordinary skill in the art. Where a combination of technical solutions ends up contradictory or unachievable, such a combination shall not be regarded as existent nor would it fall within the scope of protection of this disclosure.

Referring to FIG. 1, in this embodiment, the file uploading and downloading method based on a smart device includes the following blocks which begin at block S100 and end at block S300.

In S100, a unique identifier (ID) of the smart device is obtained and entered into a mobile device.

In S200, a communication connection is established between the mobile device and the smart device through a proxy service.

In S300, the mobile device uploads a file to the smart device or downloads a file from the smart device.

According to the file uploading and downloading method based on a smart device that is provided by this embodiment, the unique ID of the smart device needs to firstly be obtained. The unique ID of the smart device is obtained through searching the local device information of the smart device, and is the unique identification code of the smart device. The unique ID of the smart device is generally stored on the main chip of the smart device. Each smart device receives an identification code during its manufacturing process for distinguishing from other individuals; the identification code is unchangeable. The smart device may be a smart television, a smart water heater, or a smart home appliance (such as a smart speaker or a smart projector) integrated with a smart system, or another such device. After reading locally the unique ID of the smart device, the unique ID is entered into the mobile device, where the mobile device includes without limitation a mobile phone, a Pad, and a personal computer (PC); the mobile device may also be another device capable of network communications. Because the mobile device and the smart device are located in different areas, their network environments and IP addresses may be different, and it is also impossible to use a USB flash drive to copy the diagnostic files from the mobile device to the smart device, or to copy out the files from the smart device that requires diagnostic analysis. Therefore, there is a need to construct a data exchange method that is not subject to the network environments, IP addresses, or areas. The "proxy service" is a session layer of an open system interconnection model, which can not only satisfy the Internet connection but it can fulfill the Local Area Network connection, and can be better used as a file transfer station to facilitate the communication connection between the mobile device and the smart device. The establishment of the communication connection between the mobile device and the smart device via the proxy service also relies on the web service for storing and exchanging relevant files. The mobile device can download the necessary files within the smart device through the web service and the proxy service, while the smart device can also obtain the files uploaded by the mobile device through the web service and the proxy service, without being constrained by the network environments and IP addresses and without needing specific connection commands.

Figure 2:
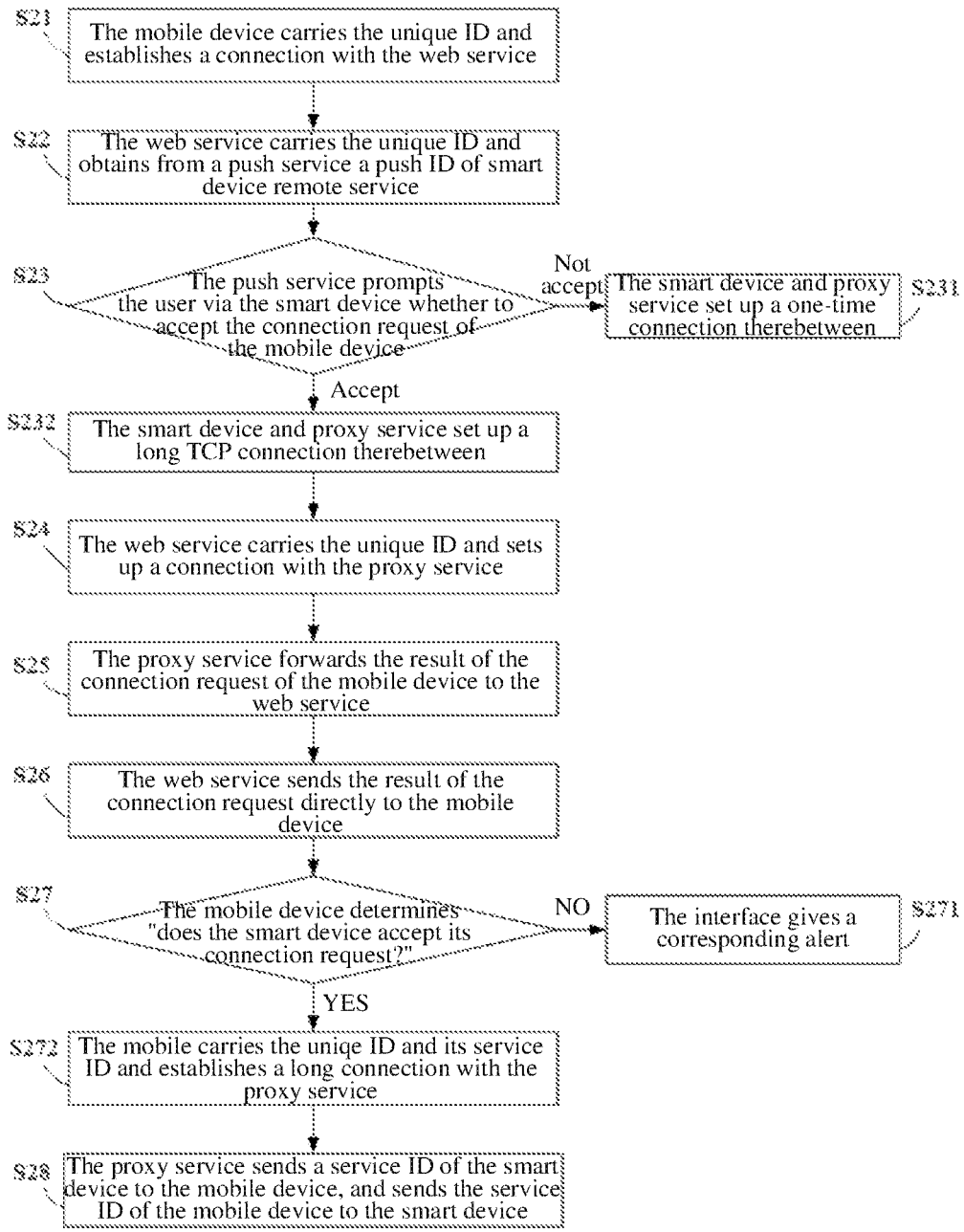
FIG. 2 is a detailed flowchart of block S200 of FIG. 1.

Further, referring to FIG. 2, the block of "establishing by the mobile device the communication connection with the smart device through the proxy service" includes the following steps which begin at step S21 and end at step S28.

In S21, the mobile device carries the unique ID and establishes a connection with a web service.

In S22, the web service carries the unique ID and obtains a push ID of smart device remote service from a push service.

In S23, the push service prompts the user via the smart device whether to accept a connection request from the mobile device. If the user doesn't accept the connection request, then turn to perform step S231; otherwise if the user accepts the connection request, turn to step S232.

In S231, the smart device and the proxy service set up a one-time connection therebetween.

In S232, the smart device and the proxy service set up a long transmission control protocol (TCP) connection therebetween.

In S24, the web service carries the unique ID and establishes a connection with the proxy service.

In S25, the proxy service sends the result of the connection request of the mobile device to the web service.

In S26, the web service sends the result of the connection request directly to the mobile device.

In S27, the mobile device determines whether the smart device accepts its connection request. If the mobile device determines the smart device doesn't accept its connection request, turn to perform step S271; otherwise if the mobile device determines the smart device accepts its connection request, turn to step S272.

In S271, the interface gives a corresponding alert.

In S272, the unique ID and a service ID of the mobile device are carried to establish a long connection with the proxy service.

In S28, the proxy service sends a service ID of the smart device to the mobile device, and sends the service ID of the mobile device to the smart device.

According to the file uploading and downloading method based on a smart device according to this embodiment, establishing the communication connection between the mobile device and the smart device through the proxy service specifically includes the following steps: S21, after entering the unique ID of the smart device to the mobile device, the mobile device carries the unique ID and initiates a connection request to the web service, for establishing a connection with the web service; S22, after receiving the connection request, the web service carries the unique ID of the smart device to obtain from the push service the push ID for the smart device to realize remote service; S23, after receiving the request message, the push service notifies the smart device that there is a mobile device wanting to connect in, then after receiving the notification message the smart device pops up a prompt box to prompt the user that there is a connection request from a mobile device for uploading or downloading a file to or from the smart device and that whether the user accepts the connection request, then if the user doesn't accept the connection request of the mobile device, turn to perform S231 in which the smart device establishes a one-time connection with the proxy service and returns the result that the smart device doesn't accept the communication connection of the mobile device to the proxy service; otherwise if the user accepts the connection request of the mobile device, turn to step S232 in which the smart device establishes a long TCP connection with the proxy service and sends the result that the smart device accepts the connection request of the mobile device as well as the smart device's own service ID together to the proxy service; S24, while the push service is prompting the user via the smart device whether to accept the connection request of the mobile device, the web service carries the unique ID of the smart device and establishes a connection with the proxy service; S25, the proxy service forwards the received result of the connection request of the mobile device to the web service; S26, since the web service has already established a connection with the mobile device, the web service directly sends the result of the connection request forwarded by the proxy service to the mobile device, whereby the mobile device can make further determination; S27, after receiving the result of the connection request sent from the web service, the mobile device performs further determination and processing so that if the smart device doesn't accept the connection request or the request is timed out or another device has been connected to the smart device, then turn to perform S271 in which the interface of the mobile device provides a corresponding alert, otherwise if the smart device accepts the connection request, then turn to perform S272 in which the mobile device sends the unique ID of the smart device and the mobile device's own service ID to the proxy service, and sets up a long connection with the proxy service; S28, according to the unique ID of the smart device, the proxy service can find out the service ID of the smart device to which the mobile device is to be connected as well as the service ID of the mobile device, and then sends the service ID of the smart device to the mobile device and sends the service ID of the mobile device to the smart device, so that the mobile device has the service ID of the smart device in the proxy service while the smart device has the service ID of the mobile device in the proxy service. At this point, the mobile device, the proxy service, and the smart device can communicate with each other using custom communication protocols.

Figure 3:
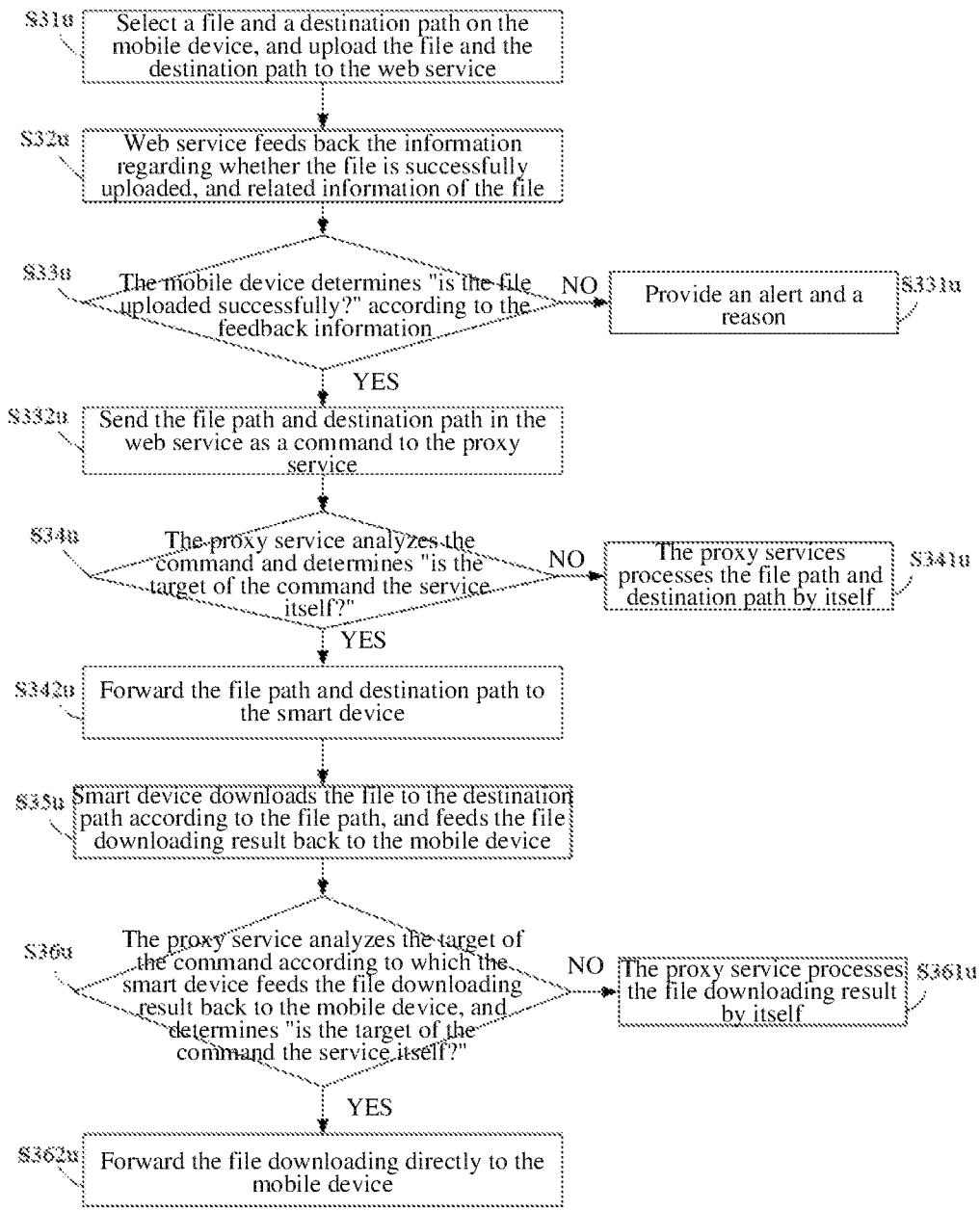
FIG. 3 is a detailed flowchart of an implementation of block S300 of FIG. 1.

Further, referring to FIG. 3, the block of "uploading by the mobile device the file to the smart device" includes the following steps S31u to S362u.

In S31u, a file and a destination path are selected on the mobile device, and are further uploaded to the web service.

In S32u, the web service feeds back information regarding whether the file is uploaded successfully, as well as related information of the file.

In S33u, the mobile device determines whether the file is successfully uploaded according to the feedback information. If the file isn't successfully uploaded, turn to perform S331u; otherwise turn to perform S332u.

In S331u, an alert and a reason are provided.

In S332u, the file path and destination path in the web service are sent as a command to the proxy service.

In S34u, the proxy service analyzes the command and determines whether the target of the command is the service itself. If the target of the command is the service itself, turn to perform S341u, otherwise turn to perform S342u.

In S341u; the file and the destination path processed by the service itself.

In S342u, the file and the destination path are forwarded to the smart device.

In S35u, the smart device downloads the file to the destination path according to the file path, and feeds the file downloading result back to the mobile device.

In S36u, the proxy service analyzes the target of the command of the mobile device to which the smart device returns the file downloading result, and determines whether the target of the command is the service itself. If the proxy service determines the target of the command is the service itself, then turn to perform S361u, otherwise turn to perform S362u.

In S361u, the file downloading result is processed by the service itself.

In S362u, the file downloading result is directly forwarded to the mobile device.

According to the file uploading and downloading method based on a smart device according to this embodiment, the mobile device uploading the file to the smart device specifically includes the following steps: S31u, the file to be uploaded and the destination path at the corresponding position of the smart device to which the file is to be uploaded are selected on the mobile device, and the file and the destination path are then uploaded to the web service; S32u, after the file and the destination file are uploaded to the web service, the web service feeds information back to the mobile device regarding whether the file is successfully uploaded, as well as related information of the file which includes a file path, a file name, and a file size; S33u, after receiving the feedback information from the web service, the mobile device determines whether the file has been successfully uploaded according to the information, and if the file fails to be uploaded, then S331u is performed to provide an alert that the file fails to be uploaded as well as a reason for the upload failure, otherwise if the upload succeeds, then S332u is performed to send the file path uploaded to the web service as well as the destination path in the smart device to which the file is to be updated to the proxy service as a command; S34u, after receiving the above command, the proxy service analyzes the target of command to which this command points and determines whether the target of command is the proxy service itself, and if the target of command points to the proxy service itself, S341u is performed in which the file path and the destination path are processed by the proxy service itself, otherwise if the target of the command doesn't point to the proxy service itself, S342u is performed to forward the above-mentioned file path and destination path to the smart device; S35u, after receiving the above file path and destination path, the smart device downloads the destination file to the destination path according to the file path, and further feeds the file downloading result back to the mobile device; S36u, after receiving from the smart device the command according to which the smart device feeds the file downloading result back to the mobile device, the proxy service analyzes the target of command to which this command points, and then determines whether the target of command points to the proxy service itself, and if the target of command points to the proxy service itself, turn to perform S361u in which the file downloading result is processed by the proxy service itself, otherwise if the target of command doesn't point to the proxy service, then turn to perform S362u in which the file downloading result is directly forwarded to the mobile device, and the mobile device would display the above information on its interface after receiving the information.

Figure 4:
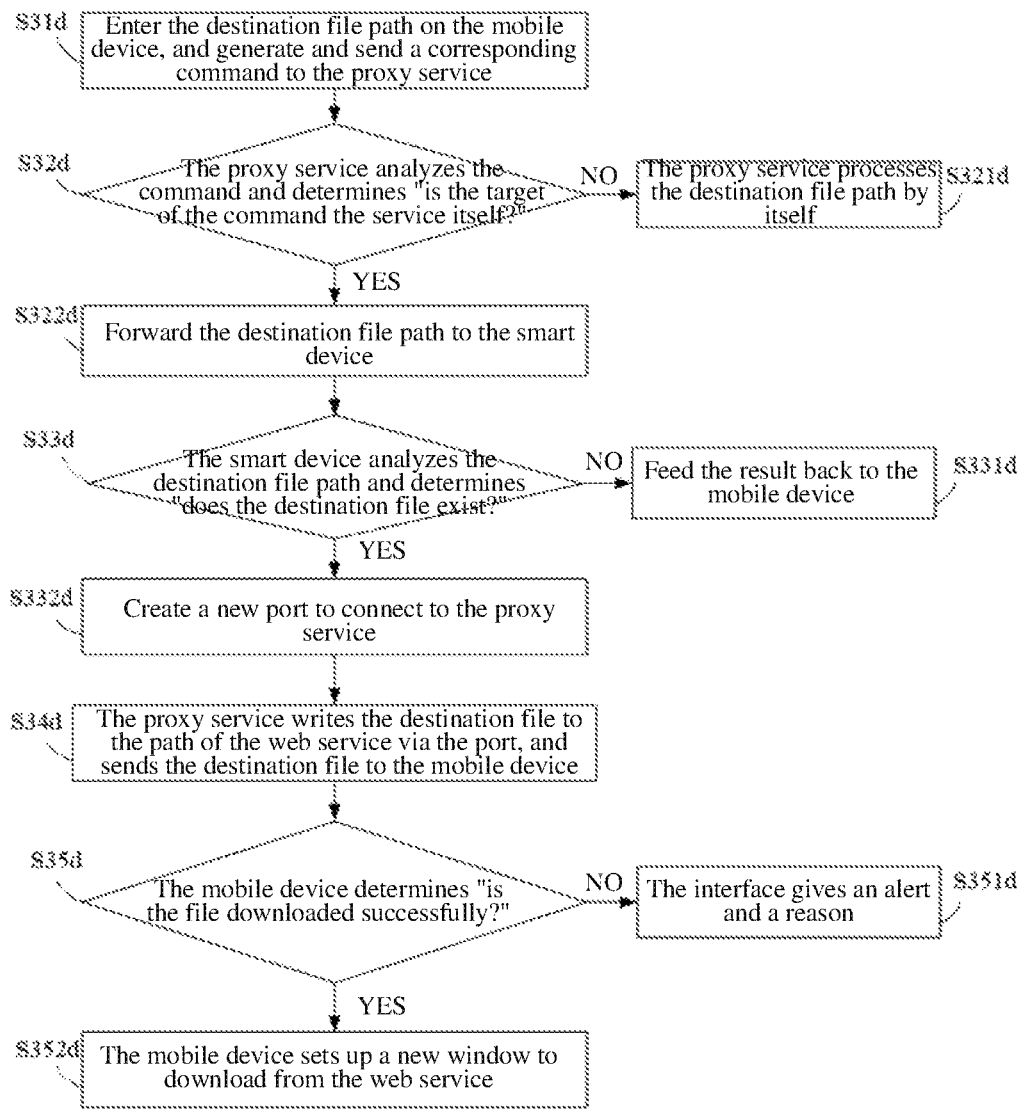
FIG. 4 is a detailed flowchart of another implementation of block S300 of FIG. 1.

Further, referring to FIG. 4, the block of "downloading by the mobile device the file from the smart device" may include the following steps S31d to S352d.

In S31d, a destination file path is entered on the mobile device and a corresponding command is generated and sent to the proxy service.

In S32d, the proxy service analyzes the command and determines whether the target of the command is the service itself. If the target of the command is the service itself, turn to perform S321d, otherwise turn to perform S322d.

In S321d, the destination file path is processed by the service itself.

In S322d, the destination file path is forwarded to the smart device.

In S33d, the smart device analyzes the destination file path and determines whether the destination file exists. If the smart device determines that the destination file doesn't exist, then turn to perform S331d, otherwise turn to perform S332d.

In S331d, the result is fed back to the mobile device.

In S332d, a new port is set up for connection with the proxy service.

In S34d, the proxy service writes the destination file to the path of the web service via the port, and further sends the destination file to the mobile device.

In S35d, the mobile device determines whether the file has been successfully downloaded. If the file hasn't been successfully downloaded, turn to perform S351d; otherwise turn to perform S352d.

In S351d, the interface provides an alert and a reason.

In S352d, the mobile device sets up a new window for downloading from the web service.

According to the file uploading and downloading method based on a smart device that is provided by this embodiment, the mobile device downloading a file from the smart device specifically includes: S31d, the file path of the destination file to be downloaded from the smart device is entered on the mobile device, and a corresponding command is generated and sent to the proxy service; S32d, after receiving the above command, the proxy service analyzes the target of command to which the command points, and determines whether the object to which target of command points is the proxy service itself, if the target of command points to the proxy service itself, then turn to perform S321d in which the destination file path is processed by the proxy service itself, otherwise if the target of command doesn't point to the proxy service itself, then turn to perform S322d in which the destination file path is forwarded directly to the smart device; S33d, after receiving the path of the above destination file, the smart device analyzes the destination file path and determines whether the destination file exists, and if the destination file to be downloaded doesn't exist, then turn to perform S331d in which the result that the destination file doesn't exist is fed back to the mobile device, otherwise if the destination file to be downloaded exists, then turn to perform S332d in which a new port is separately created for connection with the proxy service; S34d, the smart device sets up a new port to connect to the proxy service and then writes the destination file to the path of the web service via this port and further sends the destination file to the mobile device, so that the mobile device can download the destination file through the web service; S35d, the mobile device determines whether the file of the web service has been successfully downloaded according to the path information of the destination file sent by the web service, and if the file download fails, then turn to perform S351d in which the interface provides the alert that the file download fails as well as the reason for the download failure, otherwise if the file download succeeds, then turn to perform S352d in which the mobile device creates a new window to go to the web service to download the above destination file.

Further, feeding the result back to the mobile device includes: feeding, by the proxy service, the analyzing result to the target of command of the mobile device, and determining whether the target of the command is the service itself, and if the proxy service determines that target of the command is the service itself, then processing the result by itself; otherwise if the proxy service determines that the target of the command isn't the service itself, then forwarding the result directly to the mobile device.

According to the file uploading and downloading method based on a smart device that is provided by this embodiment, "feeding the result back to the mobile device" in step S331d specifically includes: the proxy service receives the command "feed the result back to the mobile device", analyzes the target of command to which the command points and then determines whether the target of command points to the proxy service itself, and if the target of command points to the proxy service itself, then the result will be processed by the proxy service itself, otherwise if the target of the command doesn't point to the proxy service itself, then the result regarding whether the destination file exists is directly forwarded to the mobile device as a feedback.

According to the file uploading and downloading method based on a smart device provided by this embodiment, the unique ID of the smart device is obtained and entered into the mobile device, whereby the mobile device establishes a communication connection with the smart device through a proxy service. As such, the mobile device can download the relevant files within the smart device through the web service and the proxy service, while the smart device can also obtain the files uploaded by the mobile device through the proxy service and the web service, without being restricted to the network environments and IP addresses and without needing specific connection commands. This solves the technical problem that existing adb method is restricted by the network environments and IP addresses while the USB flash drive approach is subject to connection commands, thereby providing ease of operation and ease of use, and enabling a wide range of applications.

The foregoing merely portrays some illustrative embodiments of this disclosure and therefore is not intended to limit the scope of protection of this disclosure. Under the inventive concept of this disclosure, any equivalent structural changes based on the specification and accompanying drawings of the disclosure and any direct/indirect applications of the disclosure on other related technical fields shall all be compassed within the scope of protection of this disclosure.

What is claimed is:

1. A file uploading and downloading method based on a smart device, comprising:
   obtaining a unique ID from the smart device and entering the ID to a mobile device;
   establishing a communication connection between the mobile device and the smart device through a proxy service; and
   uploading or downloading, by the mobile device, a file to or from the smart device;
   wherein the operation of establishing a communication connection between the mobile device and the smart device through a proxy service comprises:
   carrying, by the mobile device, the unique ID, and establishing a connection with a web service;
   carrying, by the web service, the unique ID, and obtaining a push ID of smart device remote service from a push service;
   prompting, by the push service via the smart device, a user whether to accept a connection request from the mobile device, and if the user doesn't accept the connection request, the smart device and the proxy service establishing a one-time connection, otherwise if the user accepts the connection request, the smart device and the proxy service establishing a long transmission control protocol (TCP) connection;
   determining, by the mobile device, whether the smart device accepts the connection request, and if the mobile device determines that the smart device doesn't accept the connection request, providing a corresponding alert on an interface; otherwise if the mobile device determines that the smart device accepts the connection request, carrying, the unique ID and a service ID of the mobile device to establish a long connection with the proxy service; and
   sending, by the proxy service, a service ID of the smart device to the mobile device, and the service ID of the mobile device to the smart device.

2. The file uploading and downloading method as claimed in claim 1, wherein prior to the step of "determining, by the mobile device, whether the smart device accepts the connection request", the file uploading and downloading method further comprises:
   carrying, by the web service, the unique ID, and establishing a connection with the proxy service;
   sending, by the proxy service, a result of the connection request of the mobile device to the web service; and
   sending, by the web service, the result of the connection request directly to the mobile device.

3. The file uploading and downloading method as claimed in claim 1, wherein the step of "uploading by the mobile device a file to the smart device" comprises:
   selecting a file and a destination path on the mobile device, and uploading, by the mobile device, the file and the destination path to the web service;
   feeding back, by the web service, information regarding whether the file is uploaded successfully, as well as related information of the file;
   determining, by the mobile device, whether the file has been uploaded successfully according to the feedback information, and if the mobile device determines that the file hasn't been successfully uploaded, providing an alert and a reason, otherwise if the mobile device determines that the file has been uploaded successfully, sending a file path and destination path in the web service as a command to the proxy service;

analyzing, by the proxy service, the command and determining whether a target of the command is the proxy service itself, and if the target of the command is the proxy service itself, processing the command by the proxy service itself, otherwise forwarding the file path and the destination path to the smart device; and downloading, by the smart device, the file to the destination path according to the file path, and feeding the file downloading result back to the mobile device.

4. The file uploading and downloading method as claimed in claim 3, wherein subsequent to the step of "downloading, by the smart device, the file to the destination path according to the file path, and feeding the file downloading result back to the mobile device", the file uploading and downloading method further comprises:

analyzing, by the proxy service, a target of the command according to which the smart device feeds the file downloading result back to the mobile device, and determining whether the target of the command is the proxy service itself, and if the proxy service determines that target of the command is the proxy service itself, processing the command by the proxy service itself, otherwise if the proxy service determines that the target of the command isn't the proxy service itself, forwarding the file downloading result directly to the mobile device.

5. The file uploading and downloading method as claimed in claim 1, wherein the step of "downloading by the mobile device the file from the smart device" comprises:

entering a destination file path on the mobile device, and generating and sending a corresponding command to the proxy service;

analyzing, by the proxy service, the command and determining whether a target of the command is the proxy service itself, and if the target of the command is the proxy service itself, processing the command by the proxy service itself, otherwise forwarding the file path and the destination path to the smart device;

analyzing, by the smart device, the destination file path, and determining whether the destination file exists, and if the smart device determines the destination file doesn't exist, feeding the result back to the mobile device, otherwise if the smart device determines the destination file exists, establishing a new port to connect to the proxy service;

writing, by the proxy service, the destination file to the path of the web service via the port, and further sending the destination file to the mobile device; and determining, by the mobile device, whether the file is downloaded successfully, and if the file hasn't been successfully downloaded, providing an alert and a reason on its interface, otherwise if the file has been downloaded successfully, setting up, by the mobile device, a new window for downloading from the web service.

6. The file uploading and downloading method as claimed in claim 5, wherein the step of "feeding the result back to the mobile device" comprises:

analyzing, by the proxy service, a target of the command according to the result which the smart device feeds back to the mobile device, and determining whether the target of the command is the proxy service itself, and if the proxy service determines the target of the command is the proxy service itself, processing the analyzing result by the proxy service itself, otherwise if the proxy service determines the target of the command isn't the proxy service itself, forwarding the analyzing result directly to the mobile device.

7. The file uploading and downloading method as claimed in claim 3, wherein the related information of the file comprises a file path, a file name, and a file size.

8. The file uploading and downloading method as claimed in claim 1, wherein the mobile device comprises a mobile phone, a Pad, and a personal computer (PC).

9. The file uploading and downloading method as claimed in claim 1, wherein the smart device comprises a smart television, a smart speaker, a smart water heater, and a smart projector.

* * * * *